March 28, 1961 B. H. SHORT ET AL 2,977,506
ELECTRONIC IGNITION SYSTEM
Filed Oct. 29, 1959

INVENTORS
Brooks H. Short
BY Richard L. Sprague

C. R. Meland
Their Attorney

United States Patent Office 2,977,506
Patented Mar. 28, 1961

2,977,506

ELECTRONIC IGNITION SYSTEM

Brooks H. Short and Richard L. Sprague, Anderson, Ind., assignors to General Motors Corporation, Detroit, Mich., a corporation of Delaware Filed Oct. 29, 1959, Ser. No. 849,500

4 Claims. (Cl. 315—183)

This invention relates to electronic ignition systems for gas turbine engines and the like and is an improvement over the electronic ignition system illustrated in copending application S.N. 760,714 filed on September 12, 1958.

In application S.N. 760,714, an electronic ignition system is illustrated that includes a vibrator power supply which immediately brought the supply leads to the main ignition condenser charging circuit and to the grid triggering charging circuit to its ultimate value of potential. This source of potential was coupled to corresponding rectifiers and to a charging resistor which in turn was connected to a particular capacitor. This circuit, made for great complicity in that a vibrator, a vibrator transformer, a full wave silicon rectifier bridge and a charging resistor, were required in the main ignition charging circuit. Use of all of these components made the device large, expensive and reduce the reliability since there were so many extra components that could fail.

It is, accordingly, an object of this invention to provide an electronic ignition system that is small in size, economical to manufacture and has increased reliability as compared to systems heretofore known.

Another object of this invention is to provide an electronic ignition system that includes a main ignition capacitor that discharges through a tube and the spark gap of an ignition device, the capacitor being charged through a rectifier from a vibrator power pack whose output per pulse is insufficient to raise the capacitor voltage to that value requisite to operate the spark gap. This object is accomplished by charging the main ignition capacitor in small steps along an exponential curve. When the ignition capacitor is charged to a potential sufficient to break down the spark gap of the spark discharge device, the tube is caused to fire to provide a discharge path for the main ignition condenser.

Still another object of this invention is to provide an electronic ignition system that includes a main ignition capacitor having a discharge path through electronic switch means such as a tube and through the spark gap of a spark discharge device, the firing of the tube being controlled by another capacitor with both the main ignition capacitor and the other capacitor being supplied with energy from a vibrator power pack in small steps and wherein the main ignition capacitor attains a sufficient charge to break down the spark gap at the instant that the other capacitor gains a sufficient charge to cause firing of the tube.

Further objects and advantages of the present invention will be apparent from the following description, reference being had to the accompanying drawings wherein preferred embodiments of the present invention are clearly shown.

Figure 1:
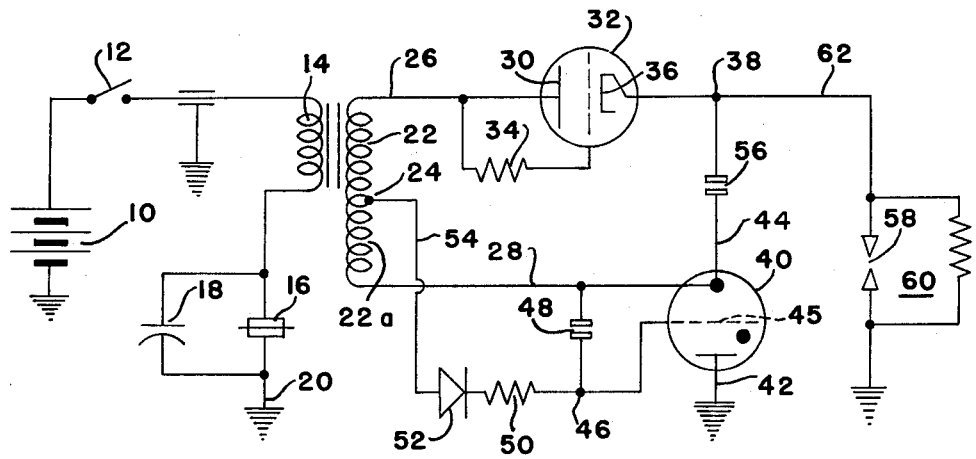
Fig. 1 is a schematic circuit diagram of an electronic ignition system made in accordance with this invention.

Referring now to the drawings and more particularly to Fig. 1, a direct current power source taking the form of a storage battery is designated by reference numeral 10. It is seen that one side of the storage battery is connected directly to ground, whereas the opposite side thereof is connected to one side of a manually operable switch designated by reference numeral 12. One side of switch 12 is connected with a coil winding 14 of a vibrator which includes the contacts 16 and a condenser 18 shunted around the contacts. One side of the contacts is connected with ground via lead wire 20, and it is seen that a circuit is completed for the vibrator coil winding 14 when the manually operable switch 12 is closed. When the switch 12 is closed, the contacts 16 open and close in a manner well-known to those skilled in the art to provide for pulses of current flow through the coil winding 14.

The coil winding 14 is inductively coupled with a coil winding 22 which is tapped at 24. One side of coil winding 22 is connected with a lead wire 26, whereas the opposite side of coil winding 22 is connected with lead wire 28. It will be appreciated that when the contacts 16 open and close, pulses of energy which are supplied to the vibrator coil winding 14 are stepped up in voltage and appear across the lead wires 26 and 28 and also appear between the tap point 24 and lead wire 28.

The lead wire 26 is connected with the plate 30 of a cold cathode gas rectifier tube designated by reference numeral 32. It is seen that the grid of tube 32 is connected with a resistor 34 which is in turn connected to lead wire 26. The cathode 36 of tube 32 is connected with junction 38 as is clearly apparent from Fig. 1.

An electronic switch means taking the form of a thyratron tube designated by reference numeral 40 is provided. The tube 40 has a plate connected directly to ground via lead wire 42 and has a cathode connected with lead wire 44. The grid 45 of tube 40 is connected with a junction 46. A capacitor 48 is connected between lead wire 28 and the junction 46. The junction 46 is also connected with resistor 50 and with a rectifier 52 which may be of the PN junction semiconductor type. One side of the rectifier 52 is connected with the lead wire 54 which is in turn connected to the tap point 24 on winding 22. It can be seen that the voltage applied to the capacitor 48 will be derived from the portion 22a of winding 22 and will be applied to this condenser through the rectifier 52 and the resistor 50.

A main ignition capacitor designated by reference numeral 56 is provided which is connected between lead wire 44 and junction 38. The main ignition capacitor 56 will at times discharge through the tube 40 and through the spark gap 58 of a spark discharge device generally designated by reference numeral 60. The spark discharge device is of the shunted surface gap type and it can be seen that the spark gap 58 is connected between the lead wire 62 and ground. It thus is clearly apparent that when the tube 40 is conducting, the main ignition capacitor will discharge through a path including junction 38, lead wire 62, spark gap 58, through the tube 40 and back to one side of the capacitor via lead wire 44.

If the circuit of Fig. 1 is to operate properly, it is imperative that the energy stored by the capacitor 56 be of a sufficient value and at sufficient voltage to cause a spark discharge across spark gap 58 at the time that the tube 40 fires. In order to insure this type of operation, the frequency of vibration of contacts 16, the self-inductance of winding 14, the primary circuit resistance, the coil ratios, and the capacitance of capacitors 48 and 56 are selected to have such values that the capacitor 48 will be charged to a value to cause the firing of tube 40 at the instant that the capacitor 56 is charged to a sufficient voltage to break down spark gap 58. In choosing the values of capacitors 48 and 56, the resistance of rectifier 52 and resistor 50 must be taken into consideration so that a proper RC time constant is achieved.

Figure 2:
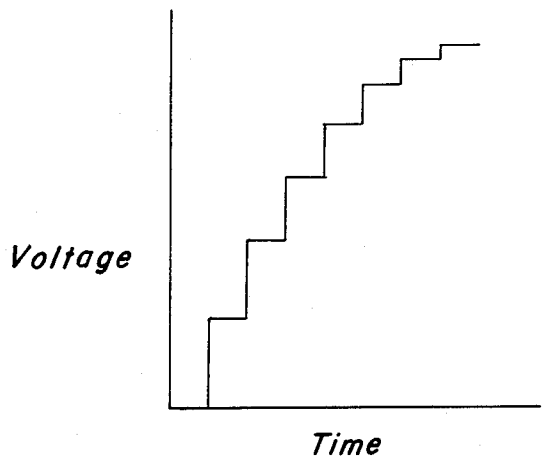
Fig. 2 is a graphical representation of the charging characteristic of the main ignition capacitor of the electronic ignition system illustrated in Fig. 1.

The capacitor 56 will be charged in accordance with the curve illustrated in Fig. 2. As shown in Fig. 2, the capacitor 56 is charged in small increments during each opening of the contact 16. An average line drawn through these small increments or steps is an exponential curve. The capacitor 48 likewise will be charged in small increments or steps along a curve similar to that illustrated in Fig. 2 and an average line drawn through these small increments or steps will also be an exponential curve. As noted hereinbefore, the frequency of vibration of the contact 16 and the circuit elements connecting the capacitors 48 and 56 with the winding 22 are so selected that the capacitor 56 attains a sufficient charge to cause a spark at spark gap 58 at the instant that capacitor 48 is charged to a sufficient voltage to cause a firing of the tube 40.

In operation, when the switch 12 is closed, the contacts 16 will be opened and closed at a rapid rate to provide pulses of current through the coil winding 14. The pulses of current in coil 14 induce voltages in coil 22, which appear on leads 26 and 28, greater than the voltage across coil 14 since coils 14 and 22 are inductively coupled and 22 has the greater number of turns. The coil windings 14 and 22 may be thought of as a transformer with the coil winding 14 being the primary winding of the transformer.

The voltage appearing across leads 26 and 28 causes the capacitor 56 to be charged in small increments in accordance with the voltage time curve of Fig. 2. The voltage appearing across tap point 24 and lead wire 28 is used to charge the condenser 48. As has been noted hereinbefore, the voltage appearing across capacitor 48 causes the tube 40 to fire at the instant that the voltage across condenser 56 is sufficient to break down the spark gap 58. When tube 40 conducts, the capacitor 56 discharges through the spark gap 58 to cause an arc for igniting a combustible mixture. It will be apparent that the spark gap 58 will continue to periodically arc as long as the switch 12 is closed, the condenser 56 charging and then discharging through the spark gap 58 at a predetermined rate of repetition. In this connection, it is to be pointed out that in order to get a desired repetition rate at the plug, the characteristics of the vibrator coil 14 must be such that the coil vibrator frequency divided by the required spark plug repetition rate must give enough energy pulses to pump the ignition capacitor 56 to the required voltage.

While the embodiments of the present invention as herein disclosed, constitute preferred forms, it is to be understood that other forms might be adopted.

What is claimed is as follows:

1. An electronic ignition system comprising, a main ignition capacitor, a spark discharge device, a thyratron tube, means connecting said ignition capacitor, said tube and said spark discharge device in a series circuit whereby said ignition capacitor discharges through said tube and spark discharge device when the voltage level of said ignition capacitor is sufficiently high to cause breakdown of said spark discharge device and said tube is conducting, means including a vibrator power pack for charging said ignition capacitor to said voltage level in small increments, a second capacitor for controlling the firing of said tube, and circuit means separate from said tube connecting said second capacitor with said vibrator power pack, said ignition capacitor and said second capacitor being charged simultaneously and said second capacitor being charged sufficiently to cause a firing of said tube when said ignition capacitor is charged sufficiently to cause breakdown of said spark discharge device.

2. An electronic ignition system comprising, a spark discharge device having a predetermined firing potential, an ignition capacitor, a thyratron tube, means connecting said ignition capacitor, said tube and said spark discharge device in a series circuit whereby said ignition capacitor discharges through said spark discharge device when the voltage level of said capacitor is sufficient to cause breakdown of said spark discharge device and said tube is conducting, a vibrator power pack including a first coil winding and a single pair of switch contacts, a second coil winding inductively coupled with said vibrator coil winding, means connecting said ignition capacitor across said second coil winding, a second capacitor connected with said tube for controlling the conduction thereof, means connecting said second capacitor with at least a part of said second coil winding whereby said capacitor is charged from said second coil winding, said second capacitor and said ignition capacitor being charged simultaneously and said second capacitor being charged to a potential sufficient to cause firing of said tube when said ignition capacitor is charged to a voltage level sufficient to cause a breakdown of said spark discharge device.

3. An electronic ignition system comprising, a main ignition capacitor, a discharge circuit for said capacitor including a spark discharge device and a thyratron tube, a charging circuit for said main ignition capacitor including a vibrator power pack, the energy output of which is employed to charge said main ignition capacitor in small increments to a voltage level sufficient to cause firing of said spark discharge device, and means including a second capacitor connected with said vibrator power pack for causing firing of said tube when the voltage level of said main ignition capacitor is sufficient to cause breakdown of said spark discharge device, said ignition capacitor and said second capacitor being charged simultaneously from said vibrator power pack.

4. An electronic ignition system comprising, a spark discharge device, a main ignition capacitor, a thyratron tube, means connecting said main ignition capacitor, said tube and said spark discharge device in series whereby said capacitor discharges through said tube and said spark discharge device when said tube is conductive and when the charge on said capacitor is sufficient to cause breakdown of said spark discharge device, a vibrator power pack including a single pair of switch contacts and a coil winding, a second coil winding inductively coupled with said first coil winding, means connecting said second coil winding with said main ignition capacitor through rectifier means, a second capacitor connected with the grid of said tube for controlling the conduction thereof, and means including a portion of said second coil winding for energizing said second capacitor through a rectifier and a resistor, the circuit components of said system being such that said second capacitor is charged simultaneously with the charging of said main ignition capacitor and to a sufficient voltage level to cause firing of said tube at the point of time when said main ignition capacitor is charged to a voltage level sufficient to cause a breakdown of said spark discharge device.

References Cited in the file of this patent

UNITED STATES PATENTS

| | | |
|---|---|---|
| 2,030,228 | Randolph et al. | Feb. 11, 1936 |
| 2,203,579 | Randolph | June 4, 1940 |
| 2,474,550 | Short et al. | June 28, 1949 |
| 2,475,994 | Short | July 12, 1949 |
| 2,837,698 | Segall | June 3, 1958 |